United States Patent
Yamada

(10) Patent No.: US 7,913,214 B2
(45) Date of Patent: Mar. 22, 2011

(54) METHOD AND PROGRAM FOR DESIGNING SEMICONDUCTOR INTEGRATED CIRCUIT

(75) Inventor: Kenta Yamada, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 437 days.

(21) Appl. No.: 12/219,058

(22) Filed: Jul. 15, 2008

(65) Prior Publication Data

US 2009/0024974 A1 Jan. 22, 2009

(30) Foreign Application Priority Data

Jul. 17, 2007 (JP) ................................. 2007-186255

(51) Int. Cl.
*G06F 17/50* (2006.01)
*G06F 9/455* (2006.01)

(52) U.S. Cl. ....................................................... 716/113

(58) Field of Classification Search ........................ 716/6
See application file for complete search history.

(56) References Cited

U.S. PATENT DOCUMENTS

| | | | | |
|---|---|---|---|---|
| 7,360,191 | B2 * | 4/2008 | Chang et al. ........................ | 716/6 |
| 2005/0108666 | A1 * | 5/2005 | Chang et al. ........................ | 716/2 |
| 2005/0132306 | A1 * | 6/2005 | Smith et al. ........................ | 716/1 |
| 2006/0010409 | A1 * | 1/2006 | Tamaki et al. ..................... | 716/6 |
| 2006/0142987 | A1 | 6/2006 | Ishizu et al. | |
| 2006/0184908 | A1 * | 8/2006 | Minami et al. ................... | 716/10 |
| 2007/0026627 | A1 | 2/2007 | Kim | |
| 2007/0033558 | A1 | 2/2007 | Nakagawa et al. | |
| 2007/0094623 | A1 * | 4/2007 | Chen et al. ......................... | 716/4 |
| 2007/0136705 | A1 * | 6/2007 | Hosono .............................. | 716/6 |

FOREIGN PATENT DOCUMENTS

| | | |
|---|---|---|
| JP | 2003-23080 | 1/2003 |
| JP | 2006-178907 | 7/2006 |
| JP | 2007-36249 | 2/2007 |

OTHER PUBLICATIONS

U.S. Appl. No. 12/219,056, filed Jul. 15, 2008, NEC Electronics Corp.
U.S. Appl. No. 12/219,057, filed Jul. 15, 2008, NEC Electronics Corp.

* cited by examiner

*Primary Examiner* — Stacy A Whitmore
(74) *Attorney, Agent, or Firm* — Foley & Lardner LLP

(57) ABSTRACT

A design method for an LSI includes: generating a delay library for use in a statistical STA, wherein the delay library provides a delay function that expresses a cell delay value as a function of model parameters of a transistor; generating a layout data; and calculating a delay value of a target cell based on the delay library and the layout data. The calculating includes: referring to the layout data to extract a parameter specifying a layout pattern around a target transistor; modulating model parameters of the target transistor such that the characteristics corresponding to the extracted parameter is obtained in a circuit simulation; calculating, by using the delay function, a reference delay value of the target cell; and calculating, by using the delay function and the modulation amount of the model parameter, a delay variation from the reference delay value depending on the modulation amount.

8 Claims, 14 Drawing Sheets

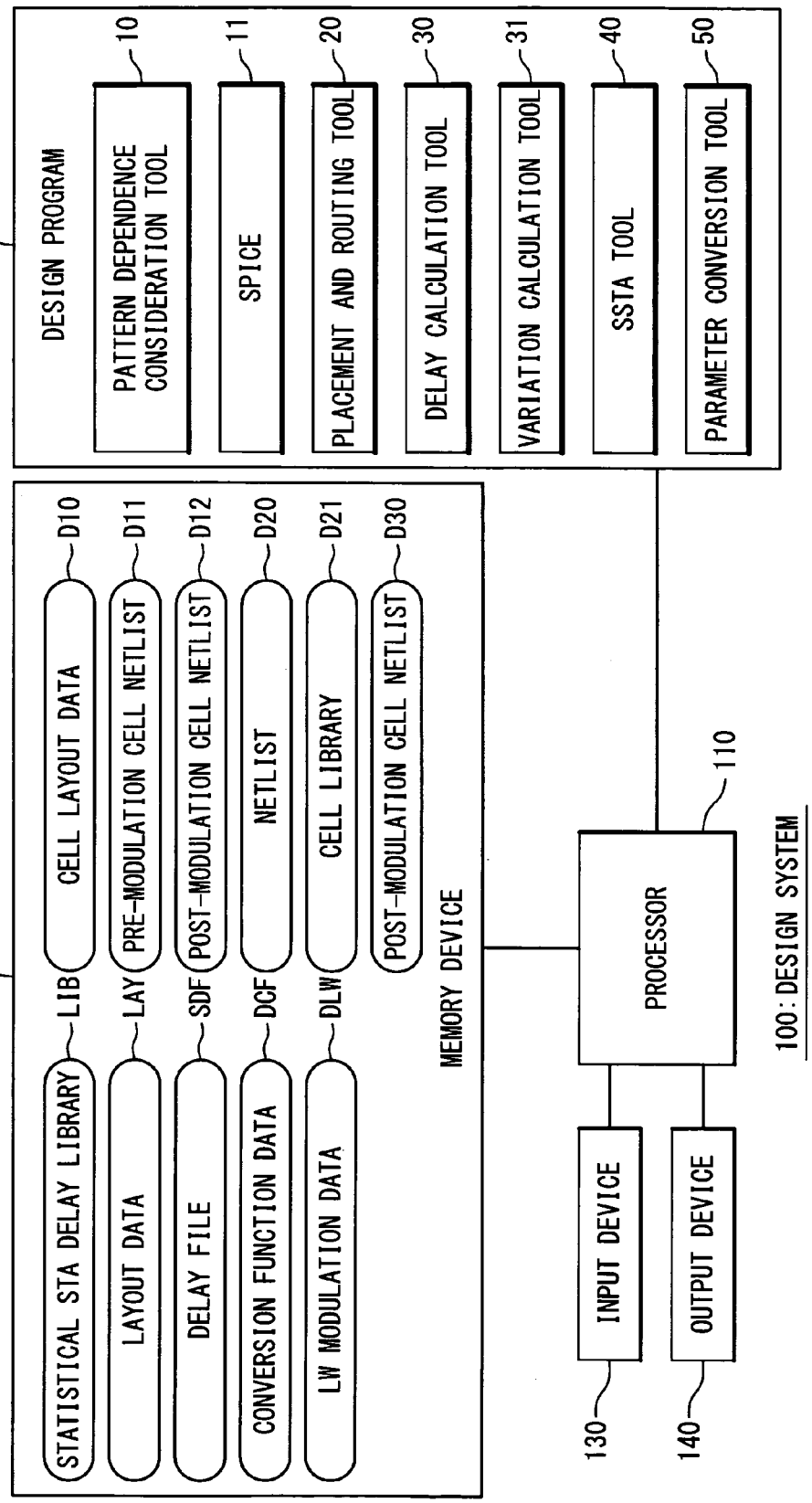

METHOD AND PROGRAM FOR DESIGNING SEMICONDUCTOR INTEGRATED CIRCUIT

INCORPORATION BY REFERENCE

This application is based upon and claims the benefit of priority from Japanese patent application No. 2007-186255, filed on Jul. 17, 2007, the disclosure of which is incorporated herein in its entirely by reference.

BACKGROUND OF THE INVENTION

1. Field of the Invention

The present invention relates to a design technique for a semiconductor integrated circuit. In particular, the present invention relates to a design technique in which layout around an element is considered.

2. Description of Related Art

Characteristics of a transistor depend on "device parameters" such as gate length L, gate width W, mobility $\mu$, threshold voltage Vt and the like. When the transistor is actually manufactured, those device parameters are likely to vary from design values. The variations of the device parameters from the design values lead to variations of the transistor characteristics from expected values. It is therefore important to sufficiently consider variation factors of the device parameters at circuit design, verification and manufacturing stages.

For example, a typical variation factor of a gate size (L and W) is OPE (Optical Proximity Effect) in photolithography processes. Due to the OPE, a resist pattern may not be formed as intended, which causes deviations of interconnection width and gate size from the design values. In particular, the variation from the design value caused by the OPE becomes more conspicuous with increasing miniaturization of semiconductor manufacturing processes. Also, the OPE becomes remarkable in a case of a high pattern density. Therefore, OPC (Optical Proximity Correction) is generally performed, in which the OPE is estimated to correct a mask data in advance (refer to US Publication 2007/0033558, for example).

Japanese Laid-Open Patent Application JP-2003-23080 discloses a technique to change a buffer cell depending on cell density in order to obtain a desired chip speed. More specifically, plural types of buffer cells having different driving capability are first prepared, and then driving capability of a buffer cell is changed at a layout design stage depending on the cell density.

Moreover, a layout pattern (or structure) surrounding a transistor can affect device parameters and characteristics of the transistor. Such a peripheral factor affecting the characteristics includes: (1) gate pitch; (2) well proximity effect; and (3) STI stress, for example.

(1) The gate pitch is an interval between a gate of a transistor and a gate of the adjacent transistor. The gate pitch affects, for example, ion dose in an ion injection process. It is known that ON-current becomes larger as the gate pitch becomes smaller while ON-current becomes smaller as the gate pitch becomes larger.

(2) The well proximity effect is described, for example, in Japanese Laid-Open Patent Application JP-2007-36249. More specifically, in a well ion injection process, a part of the injection ions collide with an edge of a resist pattern to be scattered. The scattered ions intrude into an active region of the transistor, which varies the threshold voltage Vt from the design value. This is the well proximity effect. The influence of the well proximity effect becomes larger, as an interval between an edge of the well and an edge of the active region becomes smaller.

(3) The STI stress, which is stress imposed on a transistor from an STI (Shallow Trench Isolation) that is a device isolation structure, affects the mobility $\mu$ in a channel (refer to Japanese Laid-Open Patent Application JP-2006-178907). When a width of the STI becomes narrower, the STI stress is increased, and thereby the mobility $\mu$ and the ON-current are changed.

As described above, a peripheral pattern (peripheral structure) around a transistor causes variation of the transistor characteristics from the design values. That is to say, the transistor characteristics have "peripheral pattern dependence". If the peripheral pattern is different between transistors, the characteristics of the transistors after manufacturing may become different, even if the transistors have the same design. It is therefore important to consider the peripheral pattern dependence of transistor at the semiconductor integrated circuit design and verification stages.

Japanese Laid-Open Patent Application JP-2006-178907 discloses a method of circuit simulation in which the STI width is considered. According to the circuit simulation, the mobility $\mu$ which is one of model parameters of a transistor is corrected depending on the STI width. More specifically, an approximate expression that expresses a relationship between the STI width and the mobility $\mu$ is created beforehand based on actually measured values or the like. Prior to the circuit simulation, a designed STI width (design value) is extracted based on the circuit layout. Then, the mobility $\mu$ as the model parameter is corrected by using the extracted STI width and the above-mentioned approximate expression. After that, the circuit simulation is performed by using the corrected model parameter. Consequently, the transistor characteristics dependent on the STI width are considered and accuracy of the circuit simulation is improved.

In this context, a tool is commercially available that modulates (corrects) a SPICE netlist used in a SPICE simulation in consideration of the peripheral pattern dependence. The tool is hereinafter referred to as "pattern dependence consideration tool".

FIG. 1 is a schematic diagram for explaining a function of the pattern dependence consideration tool. First, a model (e.g. $\Delta\mu=f(X)$) that expresses a relationship between graphical information (e.g. STI width X) and modulation amount (e.g. $\Delta\mu$) of a SPICE model parameter is created through evaluation of TEG (Test Element Group). After that, the SPICE simulation of a cell is performed.

Prior to the SPICE simulation, the pattern dependence consideration tool reads a SPICE netlist (pre-modulation cell netlist) of a target cell and a layout data (cell layout data) of the target cell. Subsequently, the pattern dependence consideration tool extracts the graphical information (X) from the cell layout data, and rewrites (modulates) the SPICE model parameter included in the pre-modulation cell netlist with reference to the above-mentioned model ($\Delta\mu=f(X)$). As a result, a post-modulation cell netlist that is a SPICE netlist after the rewriting is generated. In the SPICE simulation, the post-modulation cell netlist output from the pattern dependence consideration tool is used. Since the peripheral pattern dependence of transistor is reflected in the SPICE netlist, the simulation accuracy is dramatically improved. It should be noted that the SPICE model parameter to be modulated is not limited to the mobility $\mu$ but can include the gate length L, the gate width W, the threshold voltage Vt or the like.

Next, a method of designing and verifying a semiconductor integrated circuit by utilizing the pattern dependence consideration tool will be described with reference to FIG. 2. The pattern dependence consideration tool is used at a cell characterization stage. As mentioned above, the pattern dependence consideration tool rewrites the pre-modulation cell netlist based on the cell layout data to generate the post-modulation cell netlist. After that, the SPICE simulation is performed by using the post-modulation cell netlist, and a delay value (expected value) of the cell is calculated. At this time, a gate size and the like of the transistor are set to corner values in consideration of manufacturing variability. As a result, cell delay values corresponding to the manufacturing variability can be obtained. A corner delay value is extracted from the calculated cell delay values, and a cell delay library that provides the corner delay value is generated. In this manner, the cell characterization is performed.

At the design/verification stage, a placement and routing tool performs cell placement and routing based on a netlist of a design circuit. As a result, a layout data indicating layout of the design circuit is generated. Next, a delay calculation tool reads the netlist, the generated layout data and the above-mentioned cell delay library, and calculates delay values in the design circuit. More specifically, the delay calculation tool calculates delay values of inter-cell interconnections, based on RC extracted from the layout data. The cell delay values (corner delay values) of cells are obtained from the cell delay library. Thus, a delay file indicating the cell delay values and path delay values is generated.

Next, delay verification (timing verification) of the design circuit is performed. More specifically, the STA tool performs an STA (Static Timing Analysis) based on the netlist and the generated delay file. If the verification result is "FAIL", the above-described placement and routing process is performed again to modify the layout data. The same processing is repeated until the verification result becomes "PASS".

With regard to the method shown in FIG. 2, there are the following problems. FIG. 3 is a schematic diagram for explaining the problems, showing one example of a cell layout used at the characterization stage. As an example, let us consider a primitive cell such as a NAND gate, an inverter or the like. The cell shown in FIG. 3 has PMOS transistors P1 to P3 and NMOS transistors N1 to N4 which are formed in a region sandwiched between a power supply line VDD and a ground line GND. The PMOS transistor P1 has diffusion regions PD1 and PD2 that are in contact with an STI. The PMOS transistors P2 has diffusion regions PD3 and PD4 that are in contact with the STI. A distance between diffusion regions of the respective PMOS transistors P1 and P2 that are placed adjacent to each other, namely, a distance X2 between the diffusion regions PD2 and PD3 is the "STI width".

According to the method shown in FIG. 2, the pattern dependence consideration tool extracts the graphical information (e.g. STI width X) from the cell layout data to calculate the modulation amount (e.g. Δμ) of the SPICE model parameter. As to the PMOS transistor P2 shown in FIG. 3, the peripheral layout pattern (e.g. STI width X2) is already known and thus the SPICE model parameter can be modulated. As to the PMOS transistor P1 placed at the outermost of the cell, on the contrary, not all peripheral layout pattern is known at the characterization stage where surrounding cells (cells on the left and right sides) are not placed yet. In FIG. 3, for example, an STI width X1 on the left side of the PMOS transistor P1 is not known at the characterization stage but becomes known at the subsequent cell placement process. Therefore, it is not possible to module the SPICE model parameter of the PMOS transistor P1 prior to the SPICE simulation. The same applies to the PMOS transistor P3, the NMOS transistors N1 and N4.

In this manner, with regard to a transistor placed at an inward area of the cell, it is possible by the above-described method to consider the peripheral pattern dependence in the SPICE simulation. However, with regard to the outermost transistor placed near the cell boundary, it is not possible to consider the peripheral pattern dependence in the SPICE simulation since the peripheral layout pattern is unknown. In other words, the peripheral pattern dependence cannot be fully considered at least with respect to the characteristics of the outermost transistor. Since the transistor characteristics affect the cell delay value, it cannot be said that the peripheral pattern dependence is fully considered in the generated cell delay library. Consequently, it cannot be said that the accuracy of the delay verification (STA) is sufficient. This contributes to reduction of yield and reliability of the semiconductor integrated circuit to be manufactured.

In view of the above-described problems, the following two new methods are suggested as alternatives to the method shown in FIG. 2.

According to the first method, types of cells adjacent to a target cell are assumed at the characterization stage for the target cell. The pattern dependence consideration tool modulates the cell netlist based on layout data of the assumed adjacent cells in addition to the cell layout data of the target cell. The resultant post-modulation cell netlist is used in the SPICE simulation so that the cell delay value of the target cell is calculated. The same processing is repeated with setting the adjacent cell type variously (for each of prepared types). As a result, plural kinds of cell delay values corresponding to respective combinations of the adjacent cells are obtained. Then, the cell delay library is generated based on the obtained plural kinds of cell delay values. The peripheral pattern dependence of the outermost transistors in the cell is considered in the generated cell delay library. However, the time (TAT) required for the cell characterization is increased as compared with that in the method shown in FIG. 2.

Furthermore, the first method is disadvantageous in that the corner condition of the cell delay value becomes stricter as compared with that in the method shown in FIG. 2. FIG. 4 schematically shows the corner condition (corner delay value) provided by the cell delay library. According to the method shown in FIG. 2, a delay value distribution corresponding to only the normal manufacturing variability is obtained. According to the first method, on the contrary, the various types of adjacent cells are assumed and thus a plurality of delay value distributions having different center delay values are obtained. Therefore, a variability range of the delay value of each cell is expanded as compared with the case where the adjacent cells are not assumed. That is to say, a "margin" corresponding to the difference of the combination of adjacent cells is further added to the variability range of the delay value of each cell. This means that the corner condition (corner delay value) becomes stricter.

At the circuit design/verification stage, it is necessary to perform the layout design such that the design circuit can operate even in the corner condition. In other words, it is necessary to repeat the layout design and delay verification until the design circuit operates in the corner condition. Therefore, when the corner condition becomes stricter, the number of the repetition times is inevitably increased and thus the time (TAT) required for the circuit design/verification is increased. Moreover, since the margin is added to the cell delay value such that every adjacent cell types can be supported, it is necessary to increase driving capability of transistors and/or to additionally insert redundant cells. This leads to increase in a chip area and power consumption. According to the first method, as described above, the design/verification TAT, chip area and power consumption are increased although the peripheral pattern dependence is fully considered.

According to the second method, the cell characterization is performed as in the case of the method shown in FIG. 2. As a result, the cell delay library in which the peripheral pattern dependence is partially considered is generated. After that, the pattern dependence consideration tool is utilized again at the circuit design/verification stage. More specifically, the pattern dependence consideration tool modulates the SPICE netlist of each cell with reference to the chip-level layout data generated in the placement and routing process. Subsequently, the SPICE simulation of each cell is performed again by using the post-modulation netlist, and a "difference (variation)" from the cell delay value given by the cell delay library is calculated. The calculated difference is reflected in the delay file. In this manner, the peripheral pattern dependence can be considered with regard to the outermost transistor in the cell.

The same processing is repeated for all cells (for example, millions of cells) included in the design circuit. That is to say, the modulation of the SPICE netlist and the SPICE simulation are executed for millions of times at the cell design/verification stage. Thus, the design/verification TAT is increased also in the second method, although the peripheral pattern dependence is fully considered.

According to the related techniques, as described above, while the peripheral pattern dependence is considered, the design/verification TAT is increased. A technique is desired which can prevent the increase in the design/verification TAT for the semiconductor integrated circuit, while considering the peripheral pattern dependence of the transistor characteristics sufficiently.

SUMMARY

In the present invention, a design technique that utilizes a delay library for use in the statistical STA is provided. The statistical STA delay library provides a delay function that expresses a cell delay value as a function of a model parameter of a transistor in the cell.

In a first aspect of the present invention, a method of designing a semiconductor integrated circuit is provided. The design method includes: (A) generating a delay library for use in the statistical STA; (B) generating a layout data indicating a layout of the semiconductor integrated circuit; and (C) calculating a delay value of a target cell included in the semiconductor integrated circuit, based on the delay library and the layout data. The calculating the delay value of the target cell includes:
referring to the layout data to extract a parameter that specifies a layout pattern around a target transistor included in the target cell; modulating a model parameter of the target transistor such that a characteristic of the target transistor corresponding to the extracted parameter is obtained in a circuit simulation; calculating, by using the delay function, a reference delay value that is a reference of a delay value of the target cell; and calculating, by using the delay function and the modulation amount of the model parameter in the above-mentioned modulating, a delay variation from the reference delay value depending on the modulation amount.

In this manner, the parameter (peripheral parameter) related to the peripheral pattern dependence of the transistor characteristics is considered. More specifically, at the cell delay value calculation stage, the peripheral parameter is extracted from the layout data and the model parameter of the transistor is modulated depending on the extracted peripheral parameter. Furthermore, a delay variation depending on the modulation amount of the model parameter is calculated by using the statistical STA delay library and the modulation amount of the model parameter. A cell delay value can be obtained by adding the calculated delay variation to the reference delay value, wherein the peripheral pattern dependence is fully considered.

Therefore, the accuracy of the delay verification is improved. Consequently, yield and reliability of the semiconductor integrated circuit to be manufactured are also improved. Moreover, it is not necessary to repeat the SPICE simulation at the circuit design/verification stage. Therefore, increase in the design/verification TAT can be prevented.

Furthermore, the margin such as shown in FIG. 4 is not added to the delay value of each cell. Although a center value of the calculated cell delay value may vary from the normal one, the variability range is the same as the normal one. As a result, the number of repetition times of the layout design and delay verification is prevented from being increased. Therefore, the increase in the design/verification TAT can be prevented. Moreover, it is not necessary to increase driving capability of transistors and/or to additionally insert redundant cells. Therefore, the increase in the chip area and power consumption can be prevented.

In a second aspect of the present invention, a design program recorded on a computer-readable medium is provided. When executed, the design program causes a computer to perform the above-mentioned design method.

In a third aspect of the present invention, a delay calculation program recorded on a computer-readable medium is provided. When executed, the delay calculation program causes a computer to perform a method of calculating a delay value of a cell in a semiconductor integrated circuit. The method includes: (a) reading a layout data indicating a layout of the semiconductor integrated circuit from a memory device; (b) reading a delay library for use in the statistical STA from the memory device; and (c) calculating a delay value of a target cell included in the semiconductor integrated circuit, based on the delay library and the layout data. The calculating the delay value of the target cell includes: referring to the layout data to extract a parameter that specifies a layout pattern around a target transistor included in the target cell; modulating a model parameter of the target transistor such that a characteristic of the target transistor corresponding to the extracted parameter is obtained in a circuit simulation; calculating, by using the delay function, a reference delay value that is a reference of a delay value of the target cell; and calculating, by using the delay function and the modulation amount of the model parameter in the above-mentioned modulating, a delay variation from the reference delay value depending on the modulation amount.

According to the present invention, it is possible to prevent the increase in the design/verification TAT for the semiconductor integrated circuit, while considering the peripheral pattern dependence of the transistor characteristics sufficiently.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 14 is a block diagram showing a configuration example of a design system according to the embodiment of the present invention.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

1. Outline

According to the present embodiment, the peripheral pattern dependence of the transistor characteristics is considered. A layout pattern around (surrounding) a transistor is hereinafter referred to as "peripheral pattern" of the transistor. A parameter that specifies the peripheral pattern is hereinafter referred to as a "peripheral parameter". The peripheral pattern of a transistor can be specified by various peripheral parameters.

For example, in the present embodiment, "gate pitch" and "STI width (inter-diffusion-region distance)" are considered as peripheral parameters related to the peripheral pattern dependence. The gate pitch is an interval between a gate of a certain transistor and a gate of a peripheral transistor placed adjacent to the certain transistor. The STI width is a width of an STI as a device isolation structure surrounding a transistor. More specifically, the STI width is a width of an STI between a certain transistor and a peripheral transistor placed adjacent to the certain transistor, which is equivalent to a distance (inter-diffusion-region distance) between diffusion regions of the respective transistors. Either the gate pitch or the STI width may be considered instead of both of them.

Figure 5:
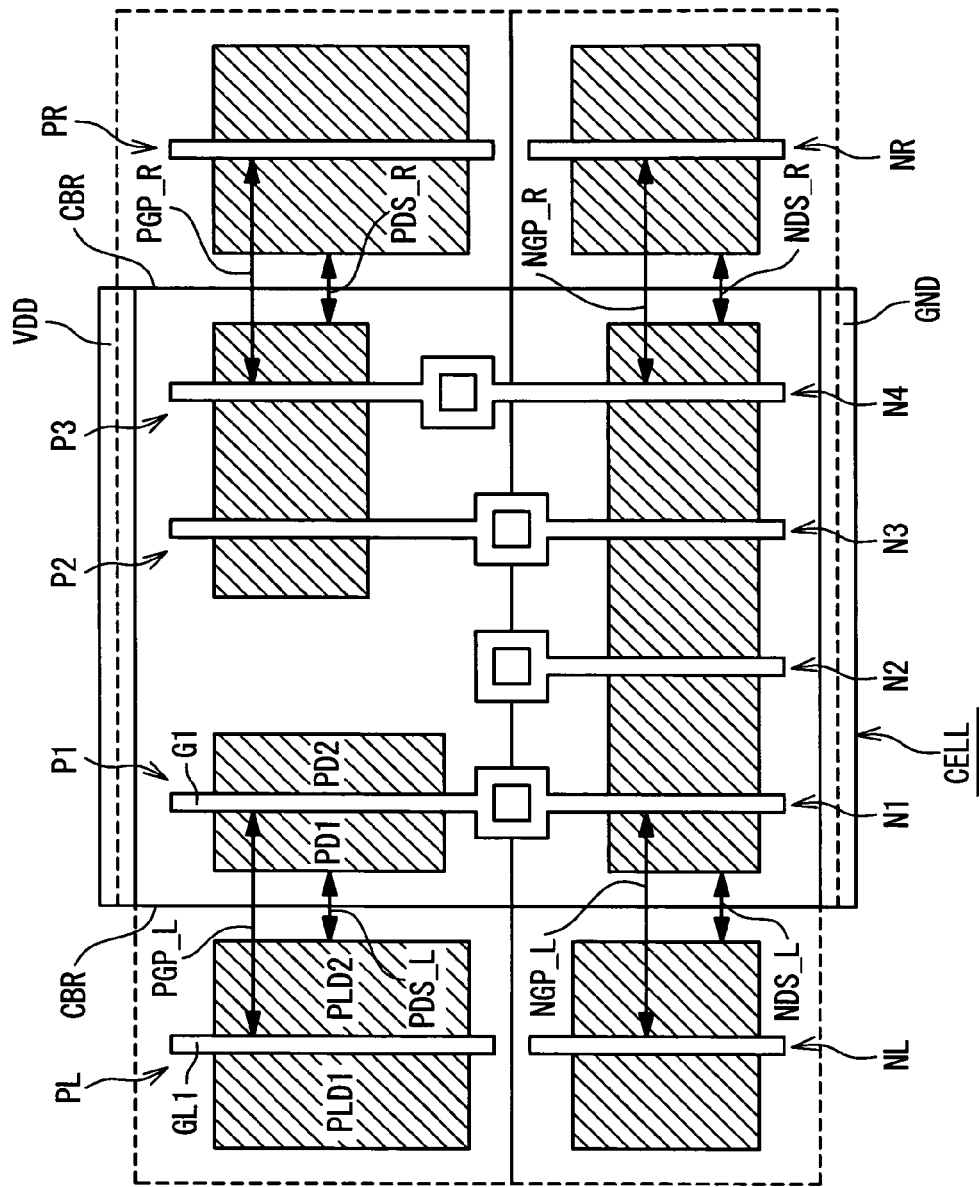
FIG. 5 is a plan view for explaining a peripheral pattern of a cell that is considered in an embodiment of the present invention.

FIG. 5 is a plan view for explaining the peripheral parameters. In particular, FIG. 5 shows peripheral parameters which are unknown at the cell characterization stage. As an example, let us consider a primitive cell such as a NAND gate, an inverter or the like.

The cell shown in FIG. 5 has PMOS transistors P1 to P3 and NMOS transistors N1 to N4. The PMOS transistors P1 to P3 and the NMOS transistors N1 to N4 are formed in a region sandwiched between a power supply line VDD and a ground line GND. A boundary (cell boundary) between the cell and adjacent cells is expressed by a reference numeral CBR. The PMOS transistors P1 and P3 and the NMOS transistors N1 and N4 are outermost transistors which are placed at the outermost in the cell, namely, near the cell boundary CBR. On the other hand, the PMOS transistor P2 and the NMOS transistors N2 and N3 are placed at an inward area of the cell as compared with the outermost transistors. In other words, each of the PMOS transistor P2, NMOS transistors N2 and N3 is sandwiched by other two transistors within the cell.

As to the transistors P2, N2 and N3 placed at the inward area of the cell, all the gate pitch and STI width can be extracted from a layout data of the cell. As to the outermost transistors P1, P3, N1 and N4, on the other hand, not all the gate pitch and STI width can be extracted only from the layout data of the cell. The reason is that the peripheral pattern of the cell is not included in the layout data of the cell.

Therefore, the peripheral pattern of the cell is supposed (assumed). In the example shown in FIG. 5, PMOS transistors PL and PR and NMOS transistors NL and NR are supposed to be placed around the cell.

As an example, let us consider the PMOS transistor P1 and the PMOS transistor PL. The PMOS transistor PL (peripheral transistor) is supposed to be placed adjacent to the PMOS transistor P1 across the cell boundary CBR. The PMOS transistor P1 has a gate G1 and diffusion regions PD1 and PD2. The diffusion regions PD1 and PD2 are surrounded by the STI. On the other hand, the PMOS transistor PL has a gate GL1 and diffusion regions PLD1 and PLD2. The diffusion regions PLD1 and PLD2 are surrounded by the STI.

In this case, a gate pitch PGP_L is an interval between the gate G1 of the PMOS transistor P1 and the gate GL1 of the PMOS transistor PL. An inter-diffusion-region distance PDS_L is a distance between the diffusion region PD1 of the PMOS transistor P1 and the diffusion region PLD2 of the PMOS transistor PL. The inter-diffusion-region distance PDS_L is equivalent to a width of the STI between the PMOS transistor P1 and the PMOS transistor PL. The gate pitch PGP_L and the STI width PDS_L specify a relative position of a layout pattern of the peripheral transistor PL with respect to a layout pattern of the PMOS transistor P1. The gate pitch PGP_L and the inter-diffusion-region distance (STI width) PDS_L, which are the peripheral parameters affecting characteristics of the PMOS transistor P1, are unknown at the cell characterization stage.

Similarly, with regard to the PMOS transistor P3 and the PMOS transistor PR which are adjacent to each other across the cell boundary CBR, a gate pitch PGP_R and a STI width PDS_R can be defined. Also, with regard to the NMOS transistor N1 and the NMOS transistor NL, a gate pitch NGP_L and a STI width NDS_L can be defined. Also, with regard to the NMOS transistor N4 and the NMOS transistor NR, a gate pitch NGP_R and a STI width NDS_R can be defined.

Although the peripheral parameters (PGP_L, PDS_L, PGP_R, PDS_R, NGP_L, NDS_L, NGP_R and NDS_R) shown in FIG. 5 affect characteristics of the outermost transistors within the cell, they are unknown at the cell characterization stage. It is therefore particularly important to consider the peripheral parameters at the circuit design stage.

Moreover, according to the present embodiment, a design technique for a semiconductor integrated circuit takes "statistical STA (SSTA: Statistical Static Timing Analysis)" into account. The statistical STA, which is one type of STA, can address the manufacturing variability more precisely as compared with a normal STA. Specifically, the statistical STA can statistically (stochastically) treats variation of the cell delay value caused by the manufacturing variability. For that purpose, a cell delay library for use in the statistical STA, which is referred to as a "statistical STA delay library" hereinafter, provides a delay function that expresses the cell delay value dependent on the manufacturing variability.

The delay function expresses a delay value t of a cell as a function of model parameter X of a transistor in the cell (t=f(X)). In general, the delay function is given by a combination of a design value (nominal value) t0 of the cell delay value t and a delay variation of the cell delay value t from the nominal value t0. The delay variation can be expressed as a function of variation ΔX of the model parameter X from its design value. Therefore, it can also be said that the delay function expresses a delay value t of a cell as a function of variation ΔX of the model parameter X (t=f(ΔX)). The delay function is given by, for example, a first-order linear function as represented by the following equation (1).

$$t = f(\Delta X)$$
$$= t0 + \sum_i (\alpha_i \cdot \Delta L_i + \beta_i \cdot \Delta W_i + \gamma_i \cdot \Delta \mu_i + \dots)$$
Equation (1)

In the equation (1), the ΔL, ΔW and Δμ respectively are variations of gate length L, gate width W and mobility μ that are SPICE model parameters (instance parameters). The suffix i indicates respective transistors constituting the cell. The $\alpha_i$, $\beta_i$ and $\gamma_i$ are sensitivity coefficients. The sensitivity coefficients are so determined as to reflect variations of the cell delay value t caused by the manufacturing variability. As indicated by the equation (1), the cell delay value t is expressed by a first-order linear combination of the variations (ΔX=ΔL, ΔW, Δμ ... ) of the model parameters. Such a delay function is generated for each cell.

In calculating a cell delay value by the use of the statistical STA delay library, the variation ΔX corresponding to the manufacturing variability is given. More specifically, a probability distribution of the variation ΔX of the model parameter in which the manufacturing variability is reflected is given. Consequently, a probability distribution of the cell delay value t in which the manufacturing variability is reflected is obtained. That is to say, it is possible to stochastically calculate the variation of the cell delay value t caused by the manufacturing variability.

Figure 6:
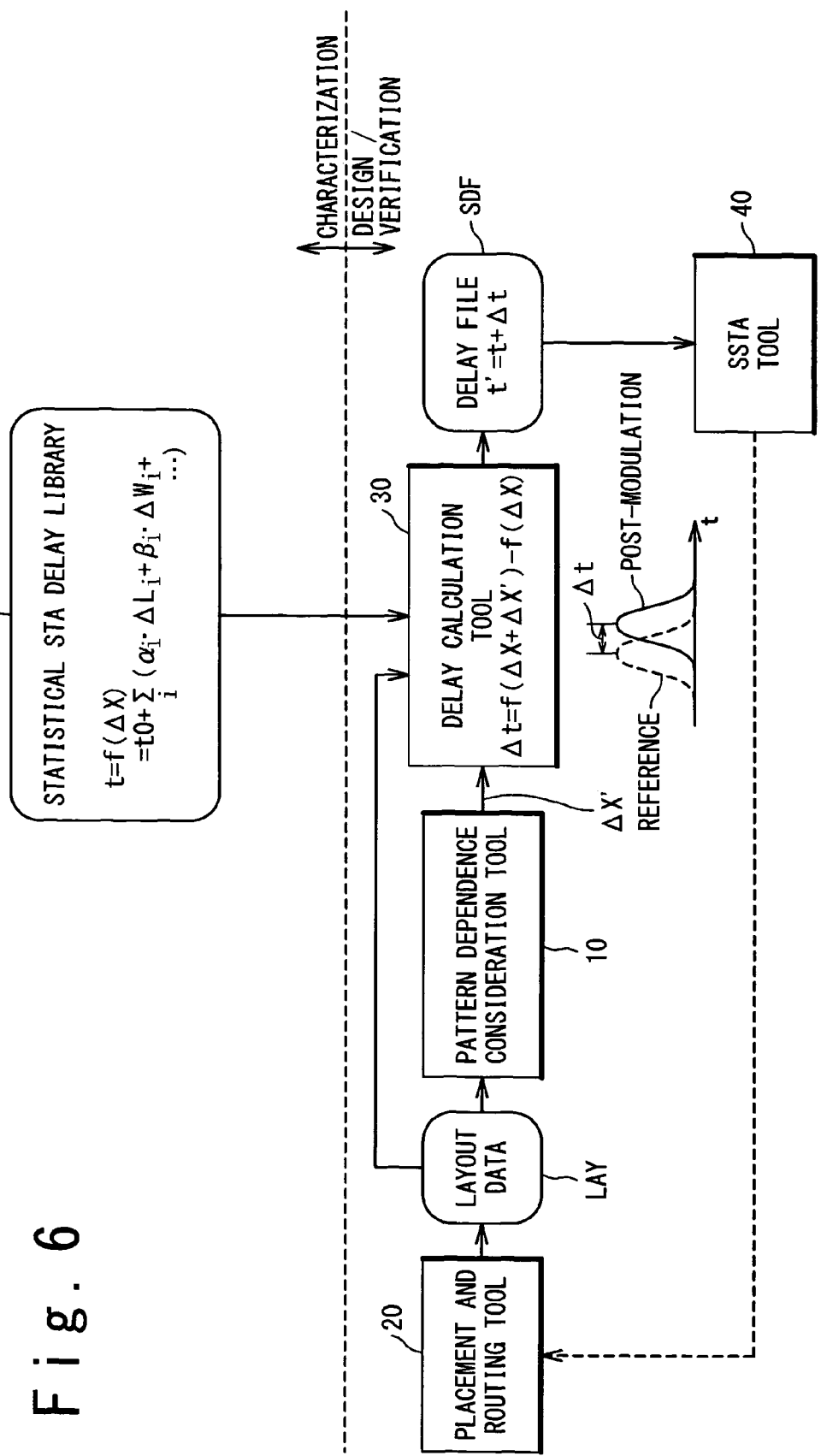
FIG. 6 is a block diagram showing a design flow of a semiconductor integrated circuit according to the embodiment of the present invention.
Figure 7:
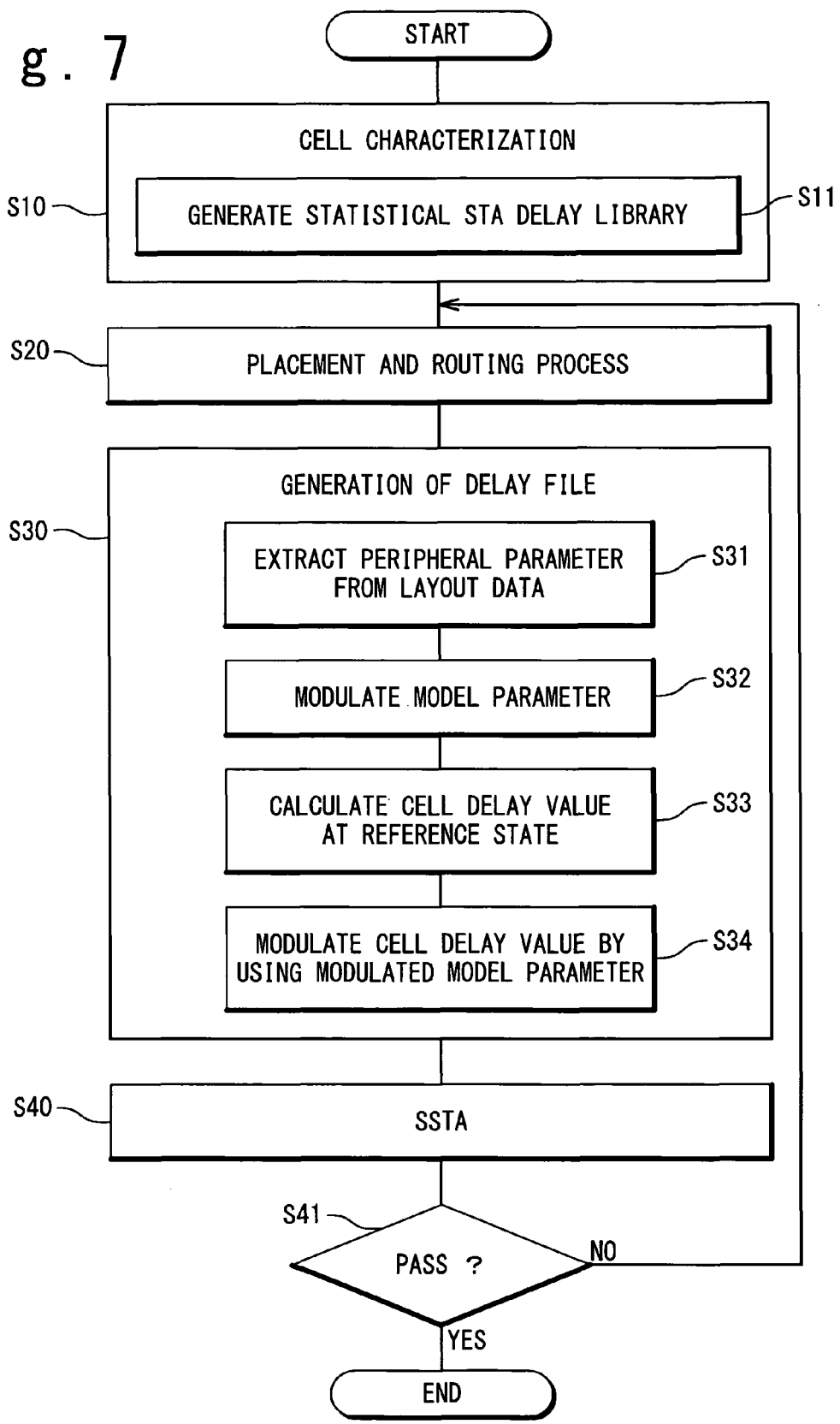
FIG. 7 is a flowchart showing a method of designing a semiconductor integrated circuit according to the embodiment of the present invention.

FIG. 6 and FIG. 7 respectively are a block diagram and a flowchart showing a design flow for a semiconductor integrated circuit according to the present embodiment. The design processing according to the present embodiment will be described with reference to FIG. 6 and FIG. 7.

Figure 1:
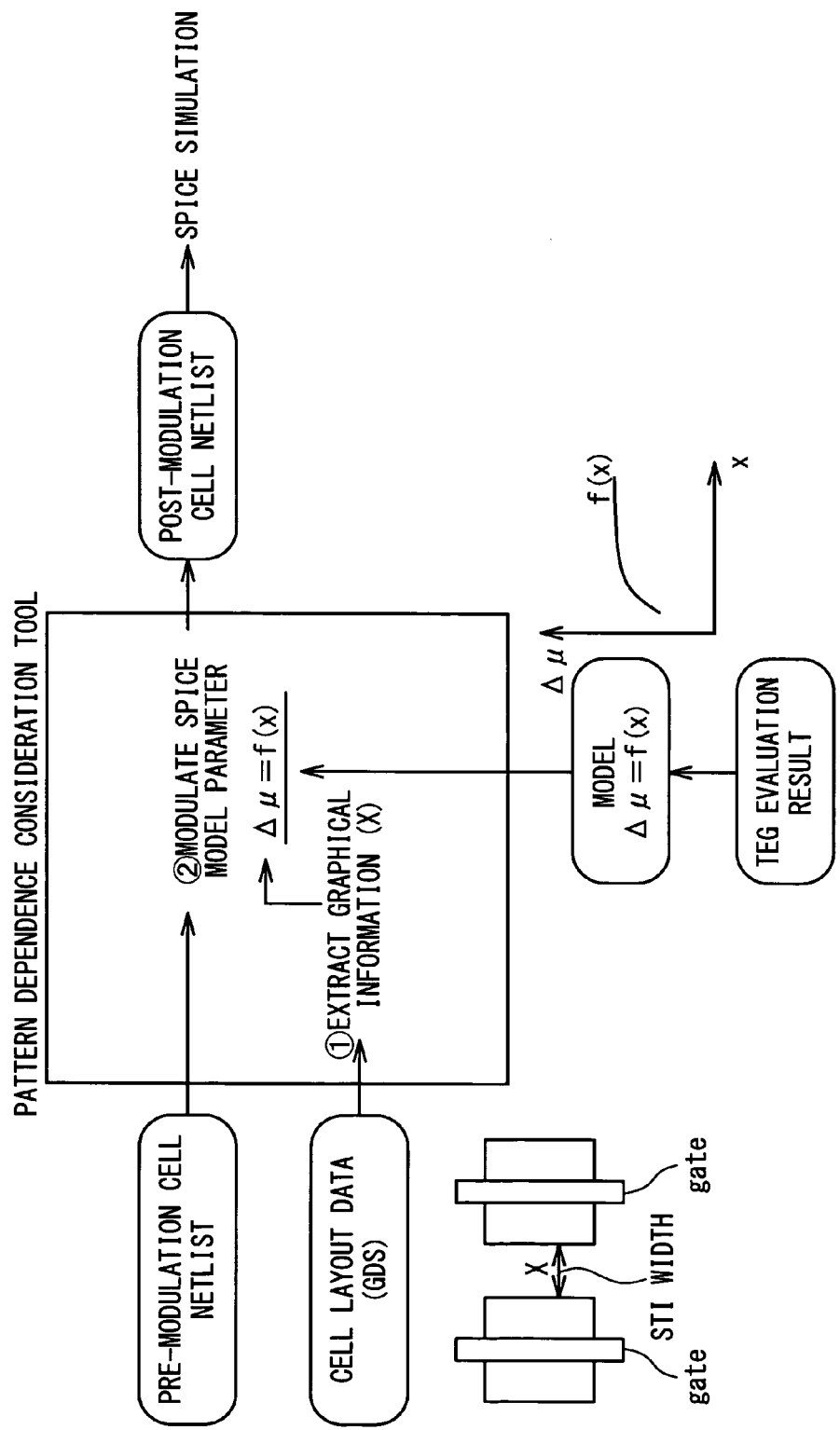
FIG. 1 is a schematic diagram for explaining a function of a pattern dependence consideration tool.
Figure 2:
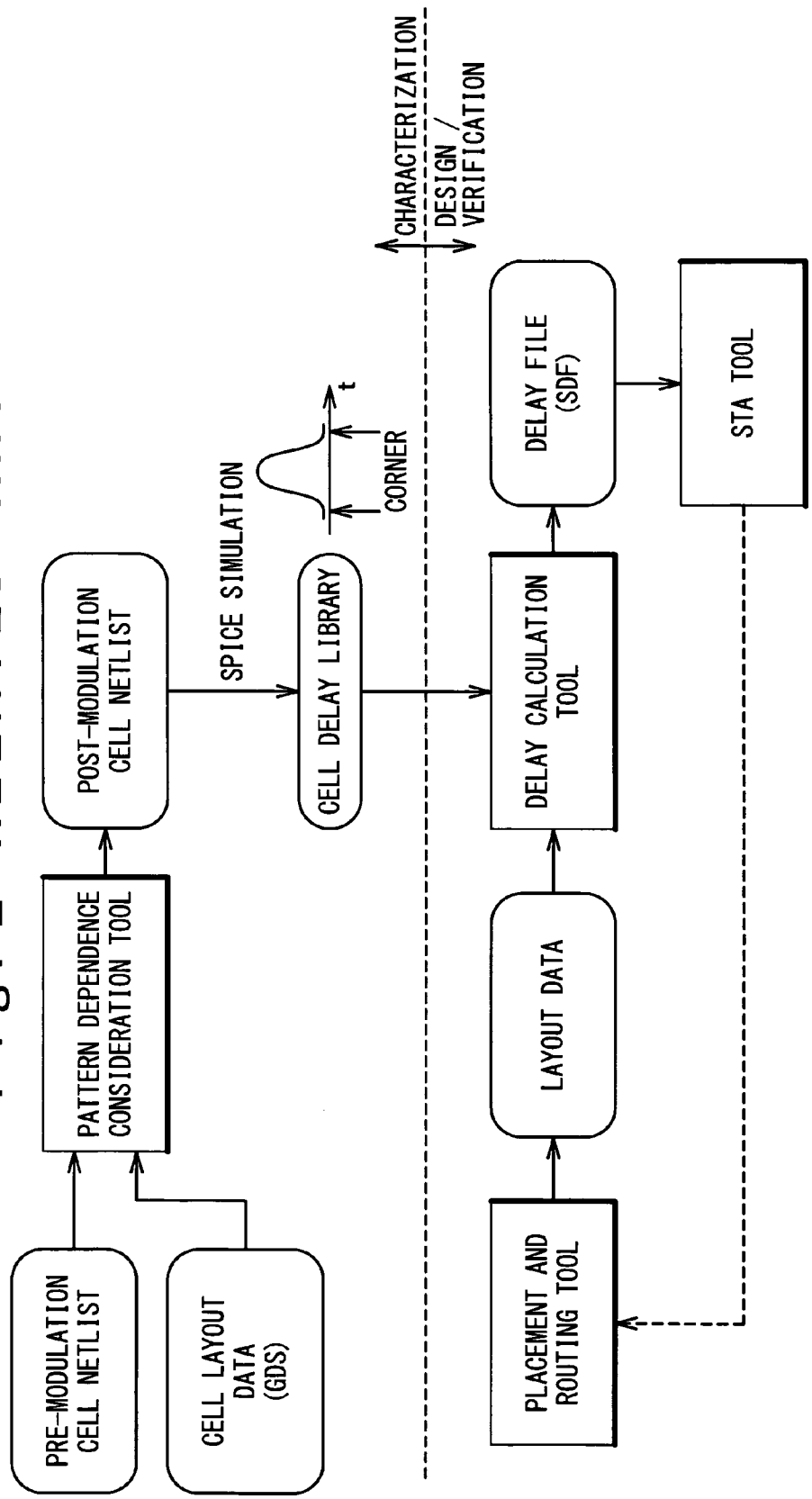
FIG. 2 is a schematic diagram showing a method of designing and verifying a semiconductor integrated circuit by utilizing the pattern dependence consideration tool.
Figure 3:
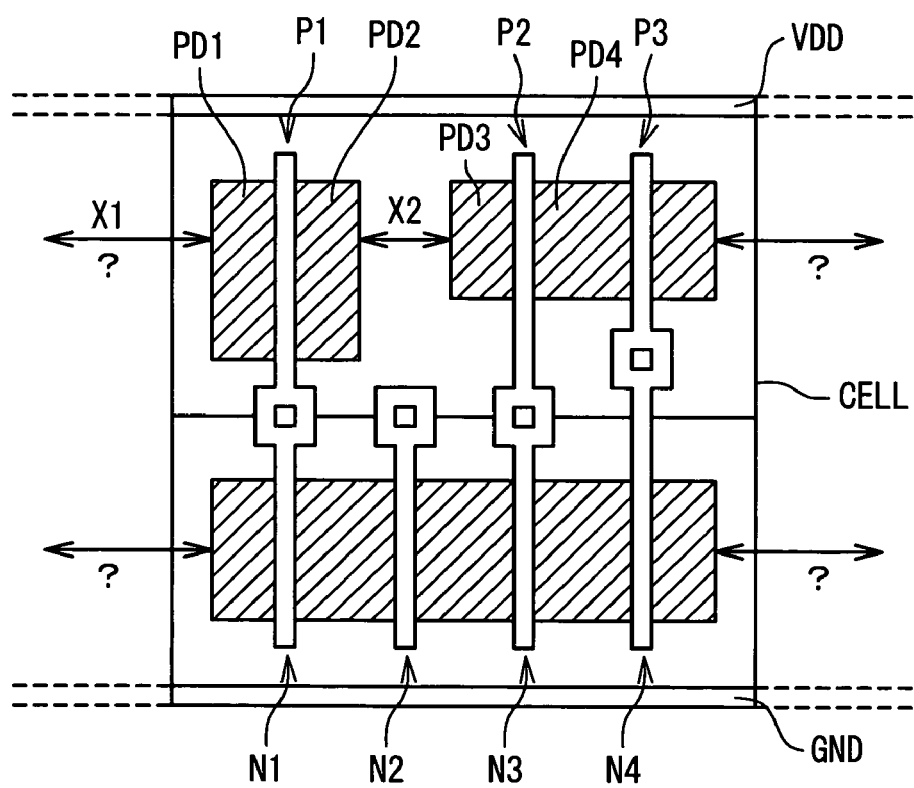
FIG. 3 is a plan view schematically showing one example of a cell layout.

Step S10:

According to the present embodiment, the statistical STA delay library LIB is generated at the time of cell characterization (Step S11). The statistical STA delay library LIB provides the delay function that is expressed by the above equation (1) for example. At the cell characterization stage, the peripheral pattern dependence needs not be considered. Alternatively, the peripheral pattern dependence may be considered with respect to transistors (e.g. P2, N2 and N3 in FIG. 5) placed at the inward area of the cell, at the cell characterization stage (refer to FIG. 1 and FIG. 2).

Step S20:

Next, at the circuit design stage, a placement and routing tool 20 performs cell placement and routing based on the cell-based design technique to generate a chip-level layout data LAY indicating a layout of a design circuit (integrated semiconductor circuit). At this stage, an actual layout pattern around the cell is determined.

Step S30:

Next, a delay file SDF that is used in timing verification (delay verification) is generated based on the generated layout data LAY and the above-described statistical STA delay library LIB.

First, the pattern dependence consideration tool 10 modulates the model parameter X with respect to each of cells included in the design circuit. As an example, let us consider a case where the model parameter X regarding a certain cell (target cell) is modulated. First, the pattern dependence consideration tool 10 refers to the chip-level layout data LAY to extract the peripheral parameters (gate pitch and STI width) associated with a target transistor included in the target cell (Step S31). At this time, actual peripheral parameters can be extracted with respect to the outermost transistors (e.g. P1, P3, N1 and N4 in FIG. 5) which are placed at the outermost in the cell.

Subsequently, the pattern dependence consideration tool 10 modulates the model parameter X of the target transistor based on the extracted peripheral parameters (Step S32). The modulation method is the same as that explained in FIG. 1. The modulation amount of the model parameter X by the pattern dependence consideration tool 10 is ΔX'. The modulation amount ΔX' is obtained by considering the peripheral pattern dependence. Therefore, transistor characteristics corresponding to the extracted peripheral parameters can be obtained (realized) in the SPICE simulation using the post-modulation model parameters.

In this manner, the pattern dependence consideration tool 10 modulates the model parameter X for each cell. If the peripheral pattern dependence has not been considered at the cell characterization stage, all the transistors included in the target cell are considered as the modulation target transistors in the Steps S31 and S32. If the peripheral pattern dependence has been once considered at the cell characterization stage, on the other hand, only the outermost transistors (e.g. P1, P3, N1 and N4 in FIG. 5) placed at the outermost in the target cell are considered as the modulation target transistors in the Steps S31 and S32.

Next, a delay calculation tool 30 reads the layout data LAY and the statistical STA delay library LIB, and calculates path delay values and cell delay values with reference to the layout data LAY and the statistical STA delay library LIB. A delay value of each cell included in the design circuit can be calculated based on the statistical STA delay library LIB. More specifically, a probability distribution of variation ΔX of the model parameter X corresponding to the manufacturing variability is first given. Then, the variation ΔX and the above-described delay function are used to calculate a probability distribution of the cell delay value t in which the manufacturing variability is reflected (t=f(ΔX)). The cell delay value t calculated at this time is a cell delay value at a reference state, which is referred to as a "reference delay value t" hereinafter. That is to say, the delay calculation tool 30 refers to the statistical STA delay library LIB to calculate the reference delay value t of each cell (Step S33).

Furthermore, the delay calculation tool 30 modulates (corrects) the delay value of each cell from the reference delay value t, in consideration of the peripheral pattern dependence. More specifically, the delay calculation tool 30 receives the modulation amount ΔX' of the model parameter X calculated at the foregoing Step S32. The modulation amount ΔX' has been calculated by considering the peripheral pattern dependence. Therefore, the delay calculation tool 30 can calculate a delay variation Δt of the cell delay value caused by the peripheral pattern dependence, by using the modulation amount ΔX' and the delay function. In other words, the delay calculation tool 30 can calculate a delay variation Δt from the reference delay value t, where the delay variation Δt depends on the modulation amount ΔX' of the model parameter. The delay variation Δt (=f(ΔX+ΔX')−f(ΔX)) is given by the following equation (2).

$$\Delta t = f(\Delta X + \Delta X') - f(\Delta X) \qquad \text{Equation (2)}$$
$$= \sum_i (\alpha_i \cdot \Delta L_i' + \beta_i \cdot \Delta W_i' + \gamma_i \cdot \Delta \mu_i' + \dots)$$

In the equation (2), each of ΔL', ΔW' and Δμ' is the modulation amount ΔX' of the model parameter due to the pattern dependence consideration tool 10. The suffix i indicates respective transistors constituting the cell. By adding the calculated delay variation Δt to the reference delay value t, the delay calculation tool 30 obtains a cell delay value t' (=t+Δt) in which the peripheral pattern dependence is considered. In this manner, the delay calculation tool 30 can modulate the cell delay value t into the cell delay value t' (Step S34).

The delay calculation tool 30 modulates the delay value of each cell included in the design circuit. Also, the delay calculation tool 30 refers to the layout data LAY and the like to calculate path delay values. As a result, the delay file SDF indicating the cell delay values and the path delay values is generated. A format of the delay file SDF is SDF (Standard Delay Format), for example. In the present embodiment, the pattern dependence consideration tool 10 and the delay calculation tool 30 serve as a delay calculation program that performs the delay calculation processing to generate the delay file SDF.

Step S40:

Next, an SSTA tool 40 performs the statistical STA based on the generated delay file SDF to perform the timing verification. Since the delay file SDF is generated by considering the peripheral pattern dependence, high verification accuracy can be achieved. Moreover, according to the statistical STA, the timing analysis is statistically performed based on the probability distribution of the cell delay value, and thus a probability that the design circuit meets timing constraints can be calculated. The probability is hereinafter referred to as a "timing yield probability". In a case where the calculated timing yield probability is lower than a predetermined targeted value, the verification result is "FAIL" (Step S41; No). In this case, the above-described placement and routing process (Step S20) is performed again to modify the layout data LAY. The same processing is repeated until the verification result becomes "PASS". When the verification result becomes "PASS" (Step S41; Yes), the delay verification is completed.

As described above, the peripheral parameters related to the peripheral pattern dependence of the transistor characteristics are considered according to the present embodiment. More specifically, at the cell delay value calculation stage, the peripheral parameters are extracted from the layout data LAY and the model parameters X of the transistor are modulated depending on the extracted peripheral parameters. Furthermore, the delay variation Δt depending on the modulation amount ΔX' of the model parameter is calculated by using the statistical STA delay library LIB and the modulation amount ΔX' of the model parameter. A cell delay value t' can be obtained by adding the calculated delay variation Δt to the reference delay value t, wherein the peripheral pattern dependence is fully considered.

Therefore, the accuracy of the delay verification is improved. Consequently, yield and reliability of the semiconductor integrated circuit to be manufactured are also improved. Moreover, it is not necessary to repeat the SPICE simulation at the circuit design/verification stage. Therefore, increase in the design/verification TAT can be prevented.

Figure 4:
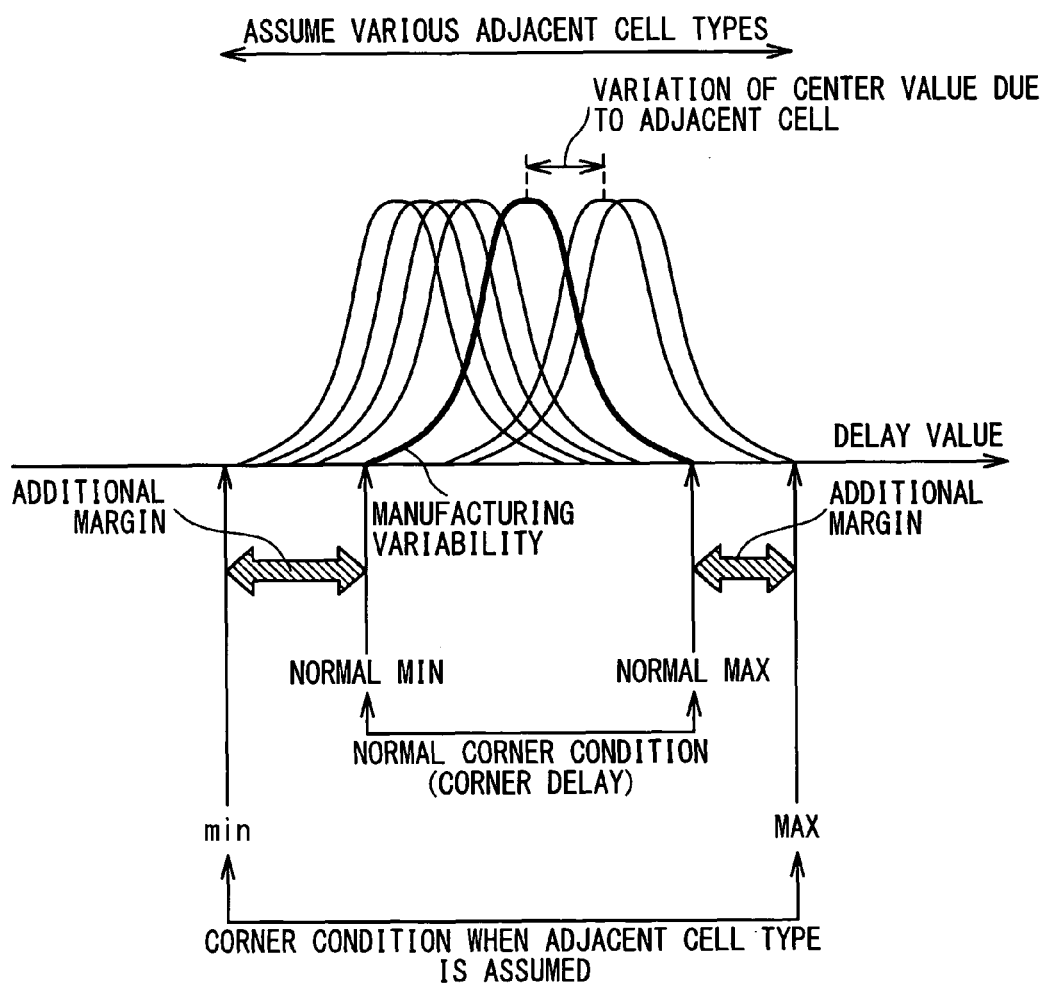
FIG. 4 is a schematic diagram showing corner delay values (corner conditions) provided by a cell delay library.

Furthermore, the margin such as shown in FIG. 4 is not added to the delay value of each cell indicated by the delay file SDF. Although a center value of the calculated cell delay value may vary from the normal one, the variability range is the same as the normal one. As a result, the number of repetition times of the layout design and delay verification is prevented from being increased. Therefore, the increase in the design/verification TAT can be prevented. Moreover, it is not necessary to increase driving capability of transistors and/or to additionally insert redundant cells. Therefore, the increase in the chip area and power consumption can be prevented.

Various examples of the processing according to the present embodiment will be described below. An example of the cell characterization (Step S10) will be described in the Section 2. An example of the cell placement and routing process (Step S20) will be described in the Section 3. Examples of the generation of the delay file (Step S30) will be described in the Section 4.

2. Characterization (Step S10)

Figure 8:
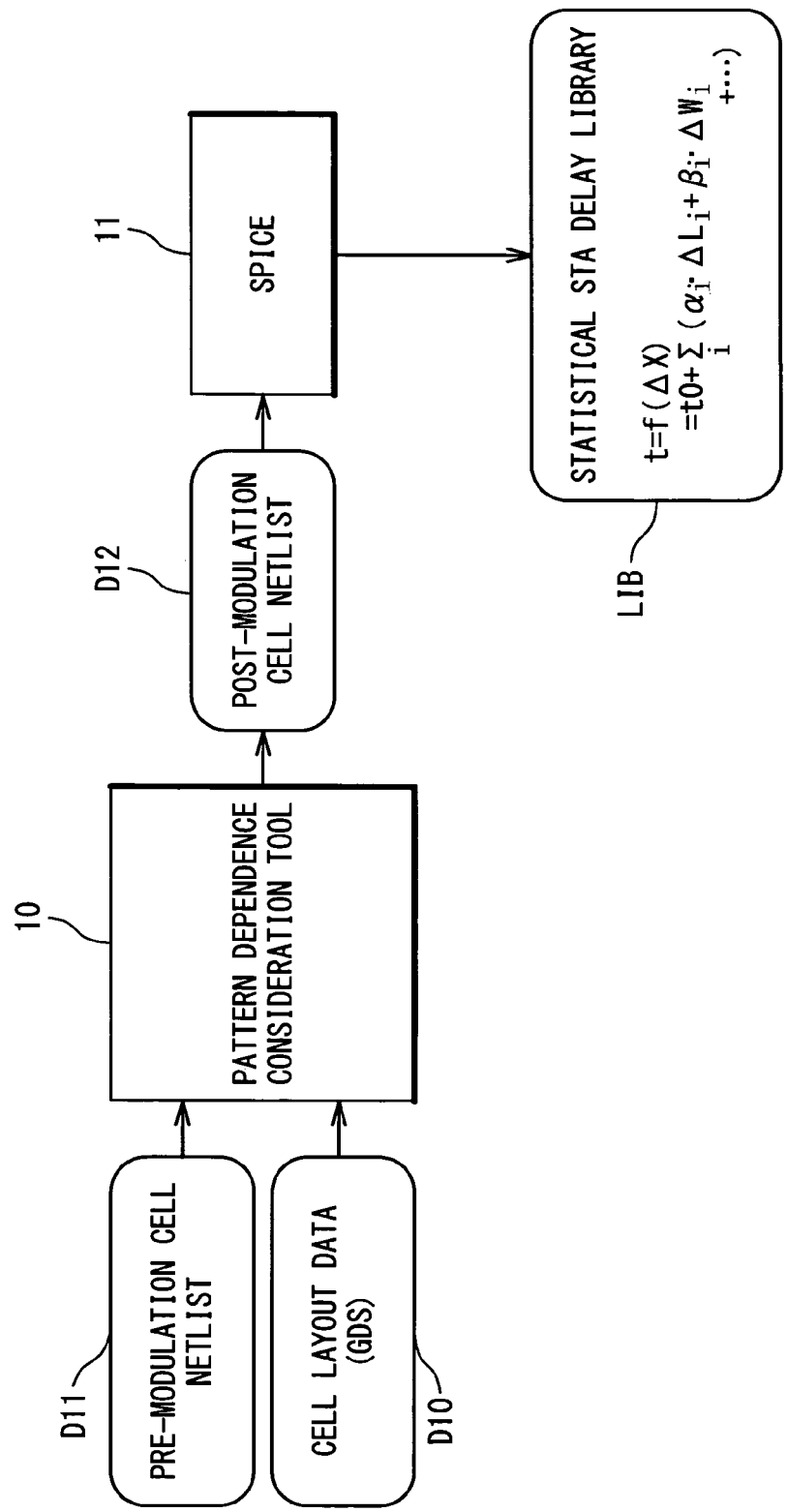
FIG. 8 is a block diagram for explaining one example of cell characterization in the embodiment of the present invention.

FIG. 8 is a block diagram for explaining one example of the cell characterization. In the present example, the peripheral pattern dependence is considered at the cell characterization stage, with regard to transistors (e.g. P2, N2 and N3 in FIG. 5) placed at the inward area of the cell. For that purpose, the pattern dependence consideration tool 10 is utilized. The pattern dependence consideration tool 10 has the same functions as the conventional pattern dependence consideration tool shown in FIG. 1.

The pattern dependence consideration tool 10 reads a cell layout data D10 and a pre-modulation cell netlist D11. The cell layout data D10 is a data indicating a layout of the cell, whose format is GDS (Graphic Design System)-II for example. The pre-modulation cell netlist D11 is a SPICE netlist of the cell. A layout pattern around (surrounding) the cell may be assumed or may not be assumed.

Subsequently, the pattern dependence consideration tool 10 modulates the pre-modulation cell netlist D11 based on the cell layout data D10. The modulation method is similar to that explained in FIG. 1. Specifically, the pattern dependence consideration tool 10 extracts the peripheral parameters (gate pitches and STI widths) from the cell layout data D10. Then, the pattern dependence consideration tool 10 modulates the SPICE model parameters included in the pre-modulation cell netlist D11, depending on the extracted peripheral parameters. As a result, a post-modulation cell netlist D12 that is a SPICE netlist after the modulation is generated.

The generated post-modulation cell netlist D12 is input to SPICE (Simulation Program with Integrated Circuit Emphasis) 11. The SPICE 11 performs the SPICE simulation by using the post-modulation cell netlist D12 to calculate a cell delay value. At this time, the SPICE model parameters are modulated in consideration of the manufacturing variability, and variations of the cell delay value corresponding to the modulation amounts are also calculated. Consequently, the cell delay values corresponding to the manufacturing variability are calculated.

After that, the statistical STA delay library LIB is generated based on the results of the SPICE simulation. More specifically, the sensitivity coefficients ($\alpha_i$, $\beta_i$, $\gamma_i$ ... ) in the above equation (1) are calculated based on the results of the SPICE simulation, and thereby the cell delay values are modeled. In this manner, the delay function expressed by the above equation (1) is created. The delay function is created for each cell. Then, the statistical STA delay library LIB that provides the delay function for each cell is generated.

3. Placement and Routing Process (Step S20)

Figure 9:
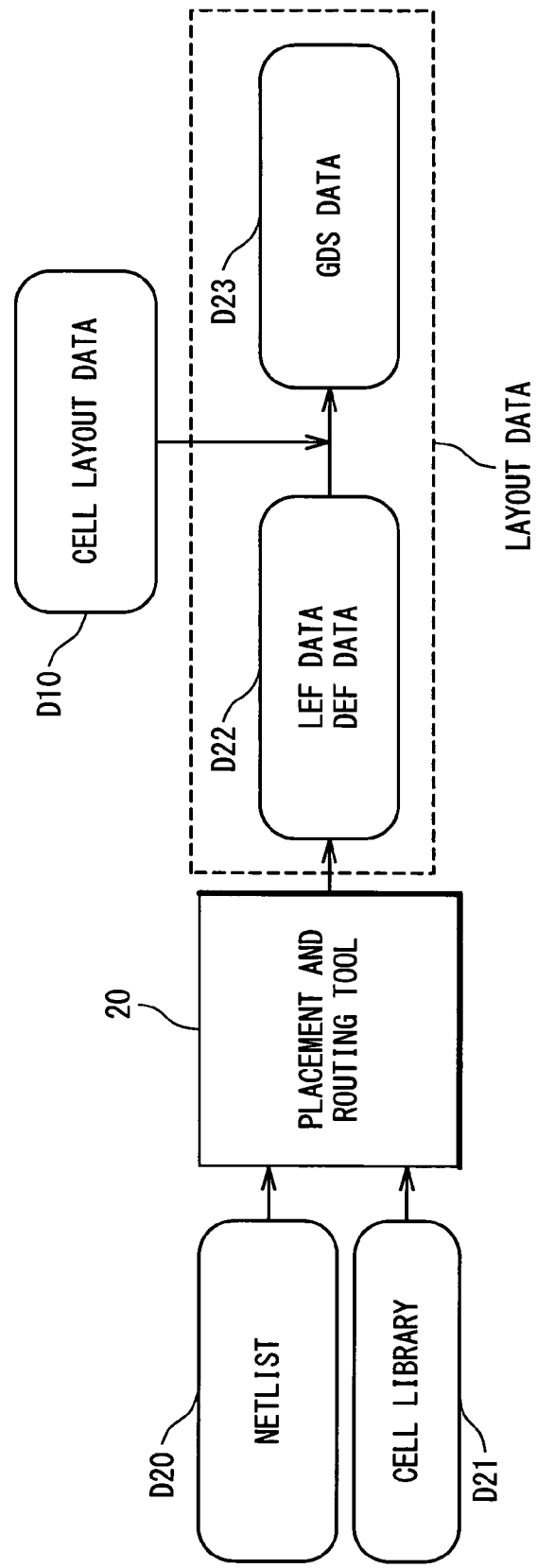
FIG. 9 is a block diagram for explaining one example of cell placement and routing process in the embodiment of the present invention.

FIG. 9 is a block diagram for explaining one example of the placement and routing process. The placement and routing tool 20 (layout tool) reads a netlist D20 and a cell library D21. The netlist D20 is a design data indicating connection relationship between cells and the like of the design circuit. The cell library D21 provides various cell data. The placement and routing tool 20 refers to the netlist D20, reads necessary cell data from the cell library D21 and performs the cell placement. Moreover, the placement and routing tool 20 performs the routing between the placed cells with reference to the netlist D20.

As a result of the placement and routing, a LEF data (or DEF data) D22 that is placement and routing information of the design circuit is generated. A format of the LEF data is LEF (Layout Exchange Format), and a format of the DEF data is DEF (Design Exchange Format). The LEF/DEF is formats in which terminals and corners of interconnections can be seen while contents of the cells cannot be seen. By combining the LEF data D22 and the above-mentioned cell layout data D10, a GDS data D23 of GDS-II format is generated.

In calculating a delay value at Step S30, the LEF data D22 or the GDS data D23 is used as the layout data LAY. It is necessary to extract the gate pitch and the STI width (interdiffusion-region distance) in calculating the delay value. Therefore, if the LEF data D22 is used, necessary information needs to be added to the LEF data D22 in advance. The information to be added is, for example, a distance from the gate or the diffusion region to the cell boundary.

4. Generation of Delay File (Step S30)

4-1. FIRST EXAMPLE

Figure 10:
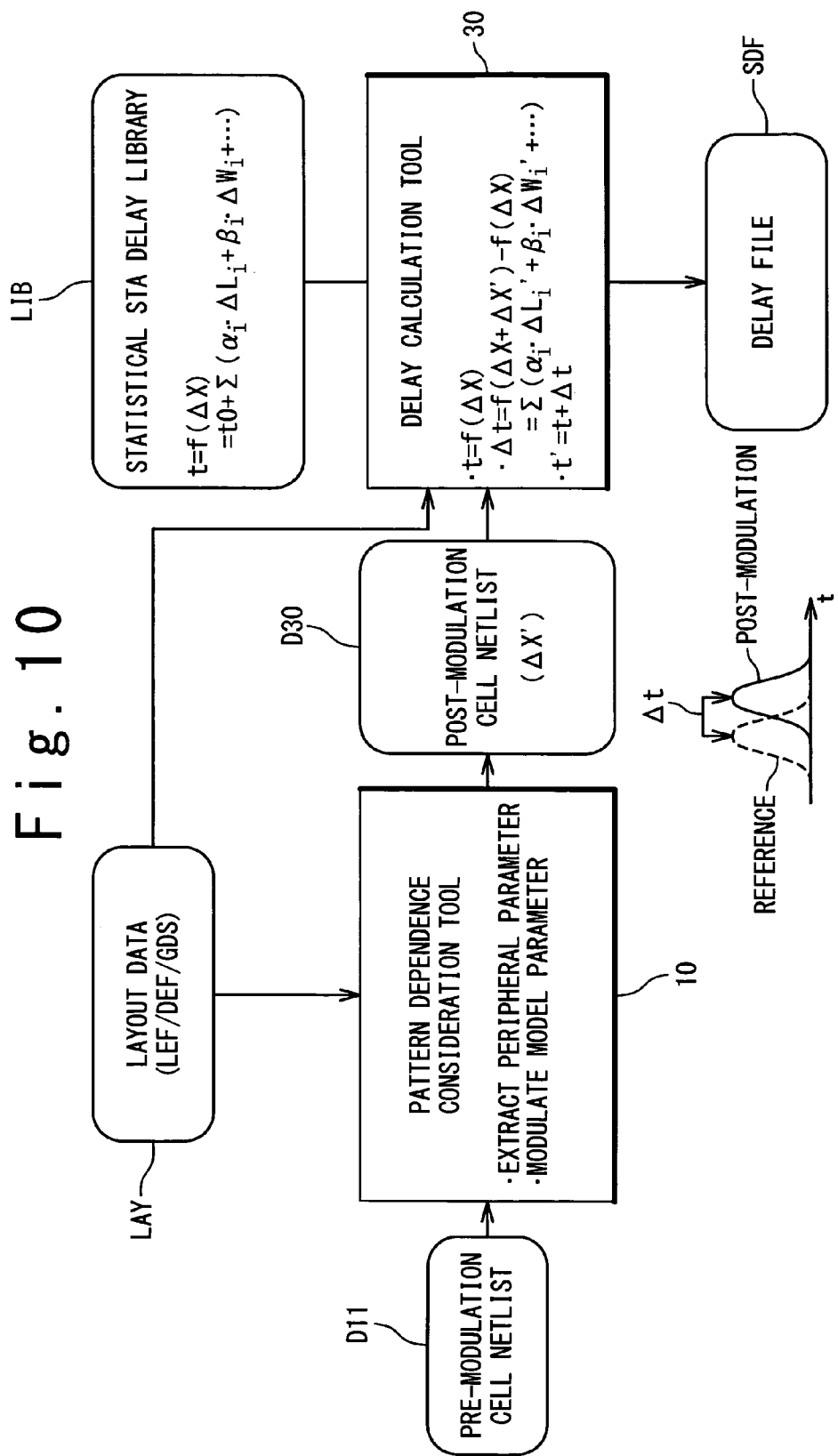
FIG. 10 is a block diagram showing one example of a method of generating a delay file in the embodiment of the present invention.

FIG. 10 is a block diagram showing a first example of a method of generating the delay file SDF. The pattern dependence consideration tool 10 reads the pre-modulation cell netlist D11 of the target cell and the layout data LAY generated in the foregoing Step S20. Then, the pattern dependence consideration tool 10 modulates the pre-modulation cell netlist D11 based on the layout data LAY.

More specifically, the pattern dependence consideration tool 10 extracts the peripheral parameters (gate pitch and STI width) associated with the target transistor included in the target cell, from the layout data LAY (Step S31). In particular, the pattern dependence consideration tool 10 extracts the peripheral parameters (PGP_L, PDS_L, PGP_R, PDS_R, NGP_L, NDS_L, NGP_R and NDS_R) associated with the outermost transistors (e.g. P1, P3, N1 and N4 in FIG. 5) placed at the outermost in the target cell.

Subsequently, the pattern dependence consideration tool 10 modulates the SPICE model parameters included in the pre-modulation cell netlist D11, depending on the extracted peripheral parameters. The modulation method is the same as that explained in FIG. 1. As a result, a post-modulation cell netlist D30 that is a SPICE netlist after the modulation is generated (Step S32). The modulation amount $\Delta X'$ of the model parameter corresponding to the extracted peripheral parameters is reflected in the post-modulation cell netlist D30. Therefore, transistor characteristics corresponding to the peripheral pattern dependence can be obtained (realized) in the SPICE simulation using the post-modulation cell netlist D30.

The delay calculation tool 30 reads the layout data LAY, the statistical STA delay library LIB and the post-modulation cell netlist D30 (or the modulation amount $\Delta X'$). Then, the delay calculation tool 30 calculates the reference delay value, t with reference to the statistical STA delay library LIB (Step S33).

Moreover, the delay calculation tool 30 extracts the modulation amounts $\Delta X'$ at the foregoing Step S32 from the post-modulation cell netlist D30. Then, the delay calculation tool 30 calculates the delay variation $\Delta t$ from the reference delay value t corresponding to the modulation amounts $\Delta X'$, in accordance with the above equation (2). Furthermore, the delay calculation tool 30 adds the calculated delay variation $\Delta t$ to the reference delay value t, to calculate the cell delay value t' ($=t+\Delta t$) in which the peripheral pattern dependence is considered. In this manner, the delay calculation tool 30 modulates the cell delay value t by using the modulation amount $\Delta X'$ of the model parameter (Step S34). Consequently, the delay file SDF in which the peripheral pattern dependence is considered is generated.

4-2. SECOND EXAMPLE

Figure 11:
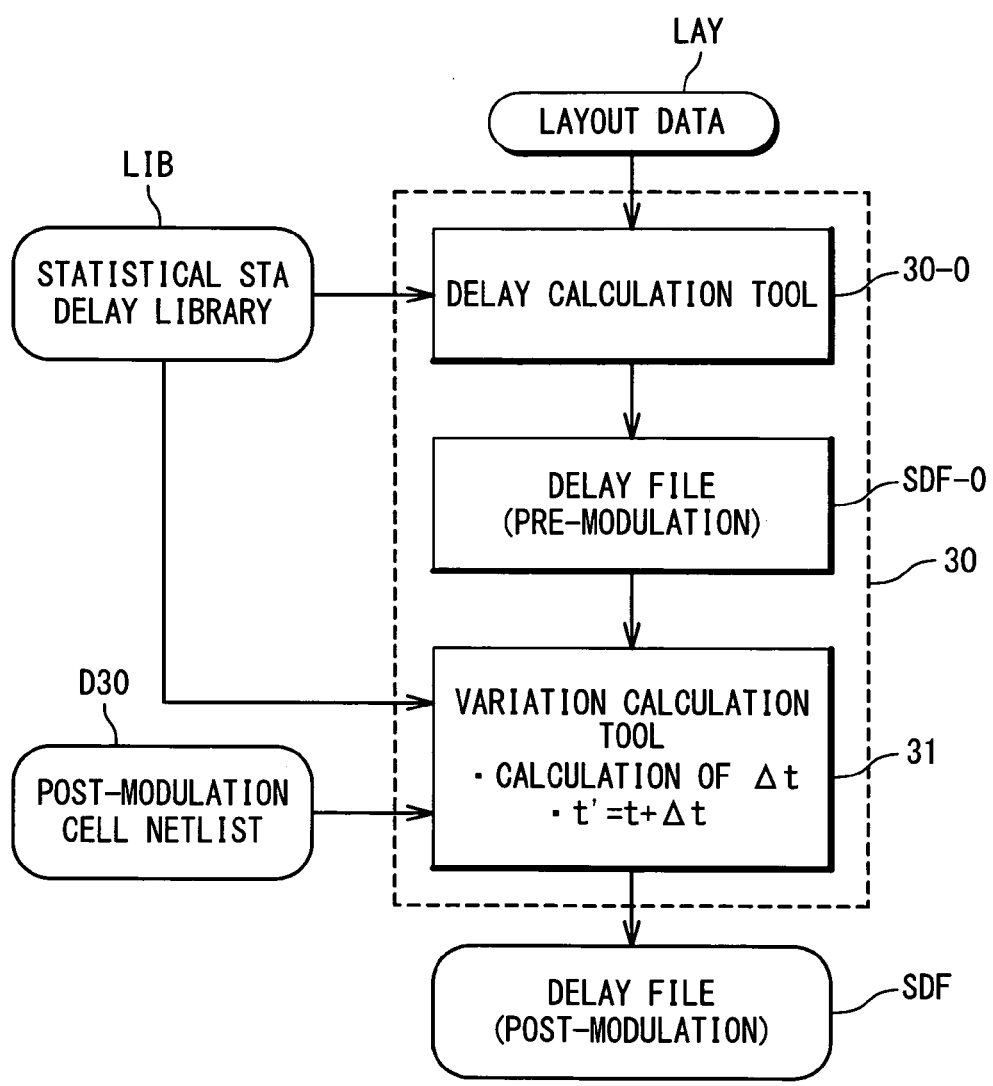
FIG. 11 is a block diagram showing another example of a method of generating a delay file in the embodiment of the present invention.

FIG. 11 is a block diagram showing a second example of a method of generating the delay file SDF. In the present example, the delay calculation tool 30 includes a conventional delay calculation tool 30-0 and a variation calculation tool 31. The delay calculation tool 30-0 generates a delay file SDF-0 as usual based on the layout data LAY and the statistical STA delay library LIB. That is, the delay calculation tool 30-0 generates the delay file SDF-0 without calculating the delay variation $\Delta t$. The delay file SDF-0 indicates the reference delay value t of each cell and the path delay values.

The variation calculation tool 31 calculates the above-mentioned delay variation $\Delta t$ based on the statistical STA delay library LIB and the post-modulation cell netlist D30. Then, the variation calculation tool 31 reads the delay file SDF-0 and modifies the delay file SDF-0 by using the delay variation $\Delta t$. In other words, the variation calculation tool 31 reflects the calculated delay variation $\Delta t$ in the delay file SDF-0 (t'=t+$\Delta t$). As a result, the delay file SDF in which the peripheral pattern dependence is considered is generated. The present example is preferable in that the processing of the present invention can be easily incorporated into the conventional flow.

4-3. THIRD EXAMPLE

In the third example, the model parameter modulated by the pattern dependence consideration tool 10 does not match the model parameter treated by the statistical STA delay library LIB. In this case, it is necessary to convert the modulation amount of the model parameter output from the pattern dependence consideration tool 10 into a modulation amount of an appropriate model parameter.

For example, let us consider a case where variations of only gate length L and gate width W among the SPICE model parameters are considered in the statistical STA delay library LIB. In this case, the delay function expresses the cell delay value as a function of a gate length variation $\Delta L$ and a gate width variation ΔW (t=f (ΔL, ΔW)). Meanwhile, the modulation target parameters in the pattern dependence consideration tool 10 are mobility μ0 and threshold voltage VT0 among the SPICE model parameters. The modulation amounts of the model parameters μ0 and VT0 are Δμ0 and ΔVT0, respectively. In this case, the modulation amounts (Δμ0, ΔVT0) need to be converted into modulation amounts (ΔL, ΔW) of the respective gate length and gate width. The modulation amounts (ΔL, ΔW) equivalent to the modulation amounts (Δμ0, ΔVT0) are referred to as "LW modulation amounts" hereinafter.

Figure 12:
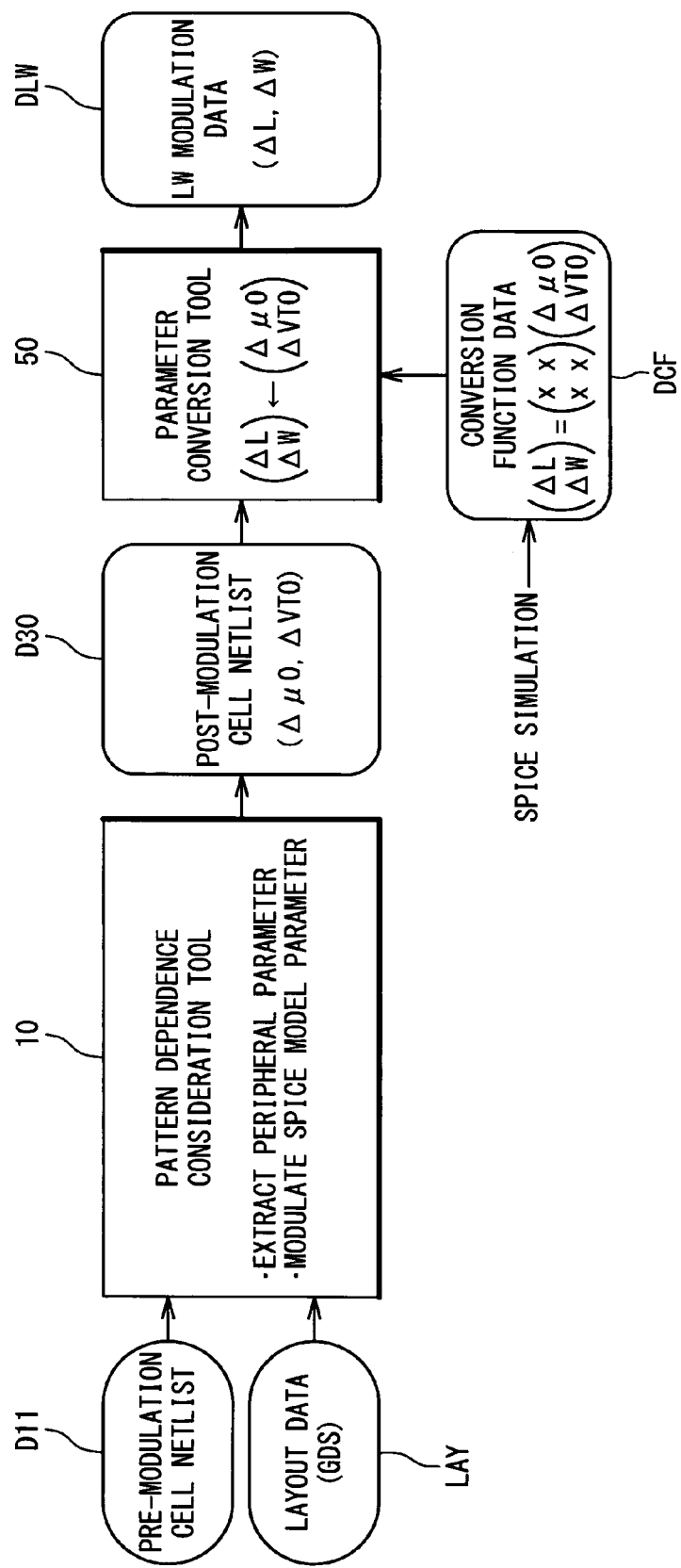
FIG. 12 is a block diagram showing a method of converting a model parameter.

FIG. 12 is a block diagram showing a method of converting the modulation amounts (Δμ0, ΔVT0) of the model parameters into the LW modulation amounts (ΔL, ΔW). The pattern dependence consideration tool 10 modulates the mobility μ0 and threshold voltage VT0 based on the layout data LAY. Then, the pattern dependence consideration tool 10 outputs the post-modulation cell netlist D30 in which the modulation amounts (Δμ0, ΔVT0) are reflected. Alternatively, the pattern dependence consideration tool 10 may directly output the modulation amounts (Δμ0, ΔVT0).

Next, a parameter conversion tool 50 obtains the modulation amounts (Δμ0, ΔVT0) of the model parameters from the output from the pattern dependence consideration tool 10. Then, the parameter conversion tool 50 converts the modulation amounts (Δμ0, ΔVT0) of the model parameters into the LW modulation amounts (ΔL, ΔW). At this time, the parameter conversion tool 50 performs the parameter conversion by using a "conversion function" provided by a conversion function data DCF. The conversion function is expressed as follows.

$$\begin{pmatrix} \Delta L \\ \Delta W \end{pmatrix} = \begin{pmatrix} \frac{\partial Ion}{\partial L} & \frac{\partial Ion}{\partial W} \\ \frac{\partial Vt}{\partial L} & \frac{\partial Vt}{\partial W} \end{pmatrix}^{-1} \begin{pmatrix} \frac{\partial Ion}{\partial \mu o} & \frac{\partial Ion}{\partial VTO} \\ \frac{\partial Vt}{\partial \mu o} & \frac{\partial Vt}{\partial VTO} \end{pmatrix} \begin{pmatrix} \Delta \mu o \\ \Delta VTO \end{pmatrix} \quad \text{Equation (3)}$$

The conversion function can be created through a SPICE simulation of the transistor characteristics, for example. More specifically, a variation of the transistor characteristics (e.g. Ion, Vt) corresponding to the modulation amounts (Δμ0, ΔVT0) of the SPICE model parameters is calculated through the SPICE simulation. It should be noted here that "Vt" indicates an electrical characteristic, while "VT0" indicates a SPICE model parameter. Subsequently, LW modulation amounts (ΔL, ΔW) with which the calculated variation of the transistor characteristics can be obtained are calculated through the SPICE simulation. By this method, the LW modulation amounts (ΔL, ΔW) are calculated with respect to each of various patterns of the modulation amounts (Δμ0, ΔVT0). Then, modeling of the LW modulation amounts is performed. Consequently, the conversion function that expresses the LW modulation amounts (ΔL, ΔW) as a function of the modulation amounts (Δμ0, ΔVT0) of the model parameters is created.

The parameter conversion tool 50 converts the output of the pattern dependence consideration tool 10 into the LW modulation amounts (ΔL, ΔW) by using the conversion function. The same processing is repeated, and the LW modulation amounts (ΔL, ΔW) is calculated for each target transistor included in the cell. As a result, a LW modulation data DLW indicating a correspondence relation between each target transistor and the LW modulation amounts (ΔL, ΔW) is generated.

Figure 13:
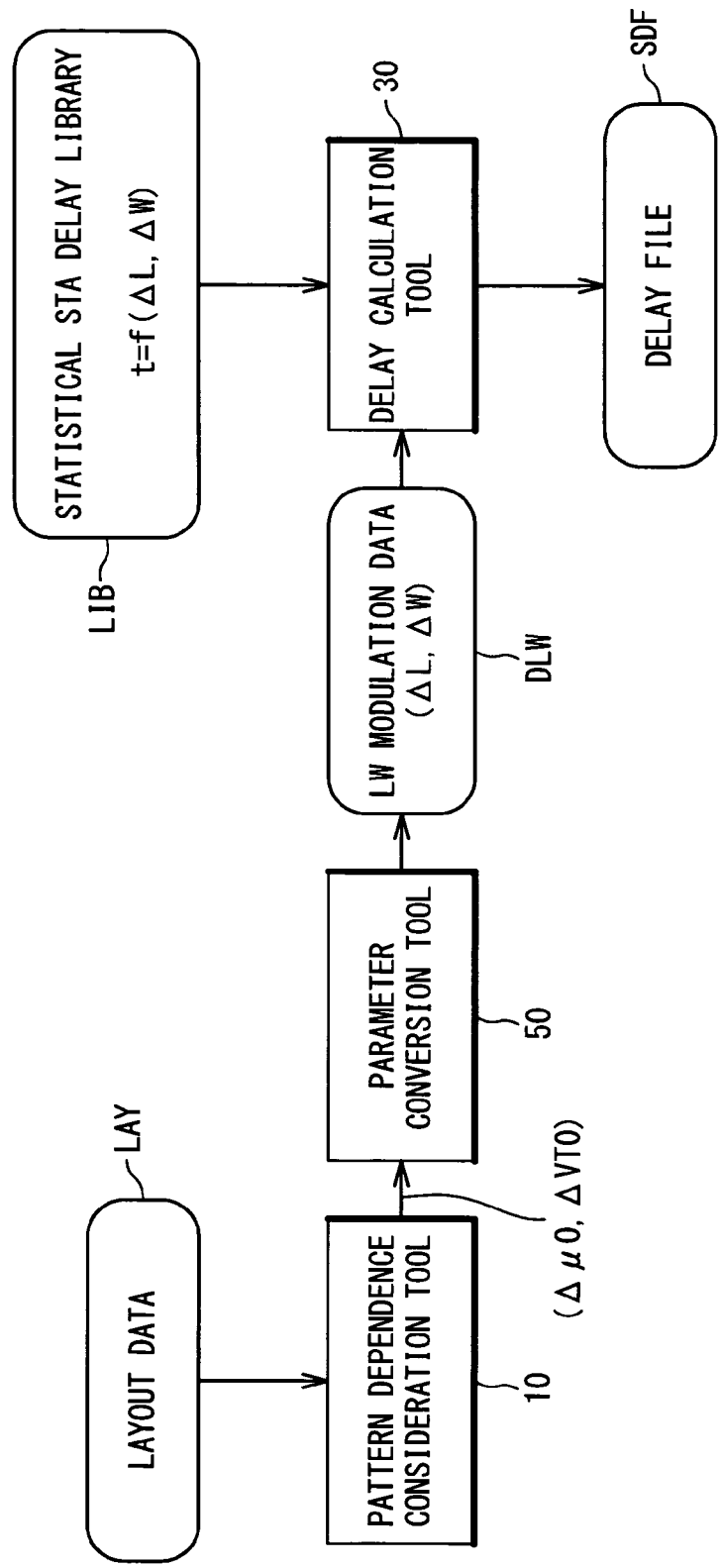
FIG. 13 is a block diagram showing still another example of a method of generating a delay file in the embodiment of the present invention.

As described above, the parameter conversion tool 50 provides a function of converting the modulation target parameters in the pattern dependence consideration tool 10 into the model parameters supported by the statistical STA delay library LIB. The function of the parameter conversion tool 50 may be given to the pattern dependence consideration tool 10. In this case, the pattern dependence consideration tool 10 converts the modulation target parameters into the model parameters on the side of the statistical STA delay library LIB. The above-described processing is equivalent to replacing influence of the peripheral pattern dependence by the variations of the model parameters on the side of the statistical STA delay library LIB FIG. 13 shows a method of generating the delay file SDF, to which the method explained in FIG. 12 is applied. An overlapping description will be omitted as appropriated. Based on the layout data LAY, the pattern dependence consideration tool 10 modulates the mobility μ0 and threshold voltage VT0 that are model parameters. Then, the parameter conversion tool 50 converts the modulation amounts (Δμ0, ΔVT0) of the model parameters into the LW modulation amounts (ΔL, ΔW) to generate the LW modulation data DLW. The delay calculation tool 30 reads the statistical STA delay library LIB and the LW modulation data DLW. The delay calculation tool 30 can calculate the delay variation Δt by using the delay function (t=f(ΔL, ΔW)) and the LW modulation amounts (ΔL, ΔW) given by the LW modulation data DLW. Consequently, the delay file SDF in which the peripheral pattern dependence is considered is generated.

5. Design System

The design method for a semiconductor integrated circuit according to the present embodiment can be achieved by a computer system. FIG. 14 is a block diagram showing a configuration example of a design system 100 according to the present embodiment. The design system 100 is provided with a processor 110, a memory device 120, an input device 130, an output device 140 and a design program 150. The memory device 120 includes a RAM and an HDD. The input device 130 includes a key board and a mouse. The output device 140 includes a display.

Stored in the memory device 120 are the statistical STA delay library LIB, the layout data LAY, the delay file SDF, the conversion function data DCF, the LW modulation data DLW, the cell layout data D10, the pre-modulation cell netlist D11, the post-modulation cell netlist D12, the netlist D20, the cell library D21, the post-modulation cell netlist D30 and so forth.

The design program 150 is software program executed by the processor 110. The design program 150 may be recorded on a computer-readable recording medium. The design program 150 may be stored in the memory device 120. The design program 150 includes the pattern dependence consideration tool 10, the SPICE 11, the placement and routing tool 20, the delay calculation tool 30, the variation calculation tool 31, the SSTA tool 40, the parameter conversion tool 50 and so forth.

The processor 110 executes the respective tools of the design program 150 to achieve the data processing. Each tool reads necessary data and files from the memory device 120 and writes generated data and files to the memory device 120. Consequently, the above-mentioned processing according to the present embodiment is achieved.

It is apparent that the present invention is not limited to the above embodiments and may be modified and changed without departing from the scope and spirit of the invention.

What is claimed is:

1. A method of designing a semiconductor integrated circuit comprising:

generating, by a processor, a delay library for use in a statistical static timing analysis, wherein said delay library provides a delay function that expresses a delay value of a cell as a function of a model parameter of a transistor in said cell;

generating a layout data indicating a layout of said semiconductor integrated circuit; and calculating a delay value of a target cell included in said semiconductor integrated circuit, based on said delay library and said layout data, wherein said calculating the delay value of the target cell comprises:

referring to said layout data to extract a parameter that specifies a layout pattern around a target transistor included in said target cell;

modulating a model parameter of said target transistor such that a characteristic of said target transistor corresponding to said extracted parameter is obtained in a circuit simulation;

calculating, by using said delay function, a reference delay value that is a reference of a delay value of said target cell; and calculating, by using said delay function and the modulation amount of said model parameter in said modulating, a delay variation that is a variation of said delay value of said target cell from said reference delay value and depends on said modulation amount.

2. The method according to claim 1,
wherein said parameter includes an interval between a gate of said target transistor and a gate of a peripheral transistor placed adjacent to said target transistor.

3. The method according to claim 1,
wherein said parameter includes a width of a device isolation structure between said target transistor and a peripheral transistor placed adjacent to said target transistor.

4. The method according to claim 1,
wherein said target transistor is a transistor placed near a boundary of said target cell.

5. The method according to claim 1,
wherein said delay function is a function of a first model parameter among model parameters of a transistor, and a second model parameter among said model parameters is modulated in said modulating,
wherein said calculating the delay variation comprises:
converting the modulation amount of said second model parameter in said modulating into a modulation amount of said first model parameter; and
calculating said delay variation by using said delay function and said modulation amount of said first model parameter.

6. The method according to claim 5, further comprising:
performing a circuit simulation of a transistor characteristic to calculate a modulation amount of said first model parameter with which a variation of said transistor characteristic depending on modulation of said second model parameter is obtained; and
generating a conversion function that expresses said calculated modulation amount of said first model parameter as a function of the modulation amount of said second model parameter,
wherein said conversion function is used in said converting the modulation amount of said second model parameter.

7. A design program recorded on a non-transitory computer-readable medium that, when executed, causes a computer to perform a method of designing a semiconductor integrated circuit, the method comprising:
generating a delay library for use in a statistical static timing analysis, wherein said delay library provides a delay function that expresses a delay value of a cell as a function of a model parameter of a transistor in said cell;
generating a layout data indicating a layout of said semiconductor integrated circuit; and
calculating a delay value of a target cell included in said semiconductor integrated circuit, based on said delay library and said layout data,
wherein said calculating the delay value of the target cell comprises:
referring to said layout data to extract a parameter that specifies a layout pattern around a target transistor included in said target cell;
modulating a model parameter of said target transistor such that a characteristic of said target transistor corresponding to said extracted parameter is obtained in a circuit simulation;
calculating, by using said delay function, a reference delay value that is a reference of a delay value of said target cell; and
calculating, by using said delay function and the modulation amount of said model parameter in said modulating, a delay variation that is a variation of said delay value of said target cell from said reference delay value and depends on said modulation amount.

8. A delay calculation program recorded on a non-transitory computer-readable medium that, when executed, causes a computer to perform a method of calculating a delay value of a cell in a semiconductor integrated circuit, the method comprising:
reading a layout data indicating a layout of said semiconductor integrated circuit from a memory device;
reading a delay library for use in a statistical static timing analysis from said memory device, wherein said delay library provides a delay function that expresses a delay value of a cell as a function of a model parameter of a transistor in said cell; and
calculating a delay value of a target cell included in said semiconductor integrated circuit, based on said delay library and said layout data,
wherein said calculating the delay value of the target cell comprises:
referring to said layout data to extract a parameter that specifies a layout pattern around a target transistor included in said target cell;
modulating a model parameter of said target transistor such that a characteristic of said target transistor corresponding to said extracted parameter is obtained in a circuit simulation;
calculating, by using said delay function, a reference delay value that is a reference of a delay value of said target cell; and
calculating, by using said delay function and the modulation amount of said model parameter in said modulating, a delay variation that is a variation of said delay value of said target cell from said reference delay value and depends on said modulation amount.

* * * * *